United States Patent
Kim et al.

(10) Patent No.: US 9,802,321 B2
(45) Date of Patent: Oct. 31, 2017

(54) MINI INTEGRATED CONTROL DEVICE

(71) Applicant: Hanwha Techwin Co., Ltd., Changwon-si (KR)

(72) Inventors: Jae Hyung Kim, Changwon-si (KR); Dong Shin Kim, Changwon-si (KR); Byung Chan Jung, Changwon-si (KR)

(73) Assignee: HANWHA LAND SYSTEMS CO., LTD., Changwon-si (KR)

( * ) Notice: Subject to any disclaimer, the term of this patent is extended or adjusted under 35 U.S.C. 154(b) by 64 days.

(21) Appl. No.: 14/770,509

(22) PCT Filed: Nov. 26, 2013

(86) PCT No.: PCT/KR2013/010766
§ 371 (c)(1),
(2) Date: Aug. 26, 2015

(87) PCT Pub. No.: WO2014/133246
PCT Pub. Date: Sep. 4, 2014

(65) Prior Publication Data
US 2016/0008985 A1 Jan. 14, 2016

(30) Foreign Application Priority Data

Feb. 28, 2013 (KR) .................. 10-2013-0022459

(51) Int. Cl.
*G05B 19/04* (2006.01)
*B25J 13/00* (2006.01)
(Continued)

(52) U.S. Cl.
CPC .............. *B25J 13/006* (2013.01); *B25J 5/00* (2013.01); *B25J 9/1676* (2013.01); *B25J 13/003* (2013.01);
(Continued)

(58) Field of Classification Search
CPC ...... B25J 13/003; B25J 13/006; B25J 19/022; B25J 19/023; B25J 5/00; B25J 9/1676;
(Continued)

(56) References Cited

U.S. PATENT DOCUMENTS 6,026,347 A * 2/2000 Schuster .................. B62D 1/28
180/167
8,595,712 B2 11/2013 Komatsu et al.
(Continued)

FOREIGN PATENT DOCUMENTS

JP 2011108129 A 6/2011
KR 1020060011561 A 2/2006
(Continued)

OTHER PUBLICATIONS

Notification for Search Report and Written Opinion dated Mar. 5, 2014, issued by the International Searching Authority in counterpart International Application No. PCT/KR2013/010766.
(Continued)

*Primary Examiner* — Rachid Bendidi
(74) *Attorney, Agent, or Firm* — Sughrue Mion, PLLC

(57) ABSTRACT

Provided is a mini integrated control device including a first control unit for receiving large-scale sensor data generated while an autonomous driving robot is operated and performing large-scale calculations in parallel, a second control unit for performing the large-scale calculations in parallel together with the first control unit, a micro control unit for monitoring a state of power of the robot, monitoring obstacles located near the robot, controlling a motor of the robot, controlling a relay module of the robot, and communicating with the first control unit, and a power supply for controlling supply of power.

10 Claims, 16 Drawing Sheets

(51) Int. Cl.
| | |
|---|---|
| *G06F 1/28* | (2006.01) |
| *G06F 11/30* | (2006.01) |
| *B25J 5/00* | (2006.01) |
| *B25J 9/16* | (2006.01) |
| *B25J 19/02* | (2006.01) |

(52) U.S. Cl.
CPC ........... *B25J 19/022* (2013.01); *B25J 19/023* (2013.01); *G06F 1/28* (2013.01); *G06F 11/3013* (2013.01); *G06F 11/3058* (2013.01); *Y10S 901/01* (2013.01)

(58) Field of Classification Search
CPC .... G06F 1/28; G06F 11/3013; G06F 11/3058; Y10S 901/01
See application file for complete search history.

(56) References Cited

U.S. PATENT DOCUMENTS

| | | | |
|---|---|---|---|
| 8,886,385 B2 | 11/2014 | Takahashi et al. | |
| 9,084,936 B2 | 7/2015 | Perlman et al. | |
| 2007/0193798 A1* | 8/2007 | Allard | H04L 67/12 180/169 |
| 2007/0219666 A1* | 9/2007 | Filippov | H04L 67/12 700/245 |
| 2008/0253085 A1 | 10/2008 | Soffer | |
| 2010/0235035 A1* | 9/2010 | Nishira | B60T 7/22 701/31.4 |
| 2012/0046820 A1* | 2/2012 | Allard | H04L 67/12 701/25 |
| 2014/0207282 A1* | 7/2014 | Angle | H04L 12/282 700/257 |

FOREIGN PATENT DOCUMENTS

| | | |
|---|---|---|
| KR | 1020080067328 A | 7/2008 |
| KR | 1020100137858 A | 12/2010 |
| KR | 1020110071097 A | 6/2011 |
| KR | 1020120058450 A | 6/2012 |
| WO | 2007048003 A2 | 4/2007 |

OTHER PUBLICATIONS

Search Report dated Mar. 5, 2014, issued by the International Searching Authority in counterpart International Application No. PCT/KR2013/010766.

Written Opinion dated Mar. 5, 2014, issued by the International Searching Authority in counterpart International Application No. PCT/KR2013/010766.

* cited by examiner

MINI INTEGRATED CONTROL DEVICE

RELATED APPLICATIONS

This application claims the benefit of Korean Patent Application No. 10-2013-0022459, filed on Feb. 28, 2013, in the Korean Intellectual Property Office, the disclosure of which is incorporated herein in its entirety by reference.

BACKGROUND

1. Field

One or more embodiments of the present invention relate to an integrated control device for artificial intelligence, military equipment, factory automation, mobile server equipment, and autonomous driving robots, and more particularly, to a mini integrated control device capable of rapidly obtaining results by processing large-scale sensor data in parallel.

2. Description of the Related Art

FIG. 1 illustrates a conventional controller. A conventional control system includes a large number of central process unit (CPU) cores in order to process large-scale sensor data as illustrated in FIG. 1. For this purpose, a plurality of personal computers (PCs) 110, 111, 112, 113, 114, and 115 are connected to one another via a gigabit Ethernet switch 120.

Alternatively, since external sensors and additional parts are connected to the control system as individual products in addition to the plurality of PCs, the control system has significant size and volume.

PRIOR ART

Non-Patent Documents

"Combining Multiple Robot Behaviors for Complex Off-Road Missions", accepted for publication at International IEEE Conference on Intelligent Transportation Systems, 2011.

"Towards Fully Autonomous Driving: Systems and Algorithms", 2011 IEEE Intelligent Vehicles Symposium (IV) Baden-Baden, Germany, Jun. 5-9, 2011.

SUMMARY

When large-scale data acquired by a sensor 100 illustrated in FIG. 1 is input to a personal computer (PC) PC1 110, the PC1 110 transmits the received large-scale data to other PCs, i.e., PC2, PC3, PC4, PC5, and PC6 111, 112, 113, 114, and 115, and shares the data therewith. Although a gigabit Ethernet switch has a theoretical data transmission rate of 100 MB/s during transmission and sharing of data, a user may get an actual data transmission rate of only about 50 MB/s. Thus, large-scale data is not efficiently shared by the PCs.

In order to overcome the foregoing problem, the PC 1 110 selects several critical frames from the large-scale sensor data and shares the frames with the other PCs 111, 112, 113, 114, and 115. Accordingly, the other PCs 111, 112, 113, 114, and 115 carry out calculations based on data having a reduced resolution, thereby reducing accuracy of the results.

One or more embodiments of the present invention include a mini integrated control device having improved data processing capability and high data processing rate.

Additional aspects will be set forth in part in the description which follows and, in part, will be apparent from the description, or may be learned by practice of the presented embodiments.

According to one or more embodiments of the present invention, a mini integrated control device includes a first control unit for receiving large-scale sensor data generated while an autonomous driving robot is operated and performing large-scale calculations in parallel, a second control unit, which is connected to the first control unit, for performing the large-scale calculations in parallel together with the first control unit, a micro control unit for monitoring a state of power of the robot, monitoring obstacles located near the robot, controlling a motor of the robot, controlling a relay module of the robot, and communicating with the first control unit, and a power supply for controlling supply of power to sensors used by the robot, the first control unit, the second control unit, and the micro control unit.

The first control unit may receive the large-scale sensor data via a gigabit Ethernet (GbE) switch.

The micro control unit may communicate with the first control unit over Ethernet and communicate with the first control unit over RS232 if the Ethernet is damaged.

The first control unit may calculate a travel path for autonomous driving based on location data of the autonomous driving robot and data regarding obstacles located near the autonomous driving robot acquired from the large-scale sensor data to allow the autonomous driving robot to select a travel path and travel to a destination while avoiding obstacles.

The second control unit may perform calculations regarding environment recognition among the large-scale calculations. The calculations regarding environment recognition include calculations of data acquired by sensors including a camera and a laser scanner.

The first control unit may be in the form of a board. PCIe communication lines connecting the first control unit and the second control unit and serial and Ethernet communication lines connected to the micron control unit may be disposed at a backplane side of the board, and a power light emitting diode (LED), a reset button, a speaker connector, a microphone, a video graphics adapter (VGA) or high definition multimedia interface (HDMI), at least one universal serial bus (USB), at least one gigabit Ethernet (GbE) switch, at least one FireWire, and at least one serial communication line may be disposed at a front panel side of the board.

According to one or more embodiments of the present invention, a mini integrated control device includes a first control unit for receiving large-scale sensor data generated while an autonomous driving robot is operated and performing large-scale calculations in parallel, a micro control unit for monitoring a state of power of the robot, monitoring obstacles located near the robot, controlling a motor of the robot, controlling a relay module of the robot, and communicating with the first control unit, and a power supply for controlling supply of power to sensors used by the robot, the first control unit, and the micro control unit.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
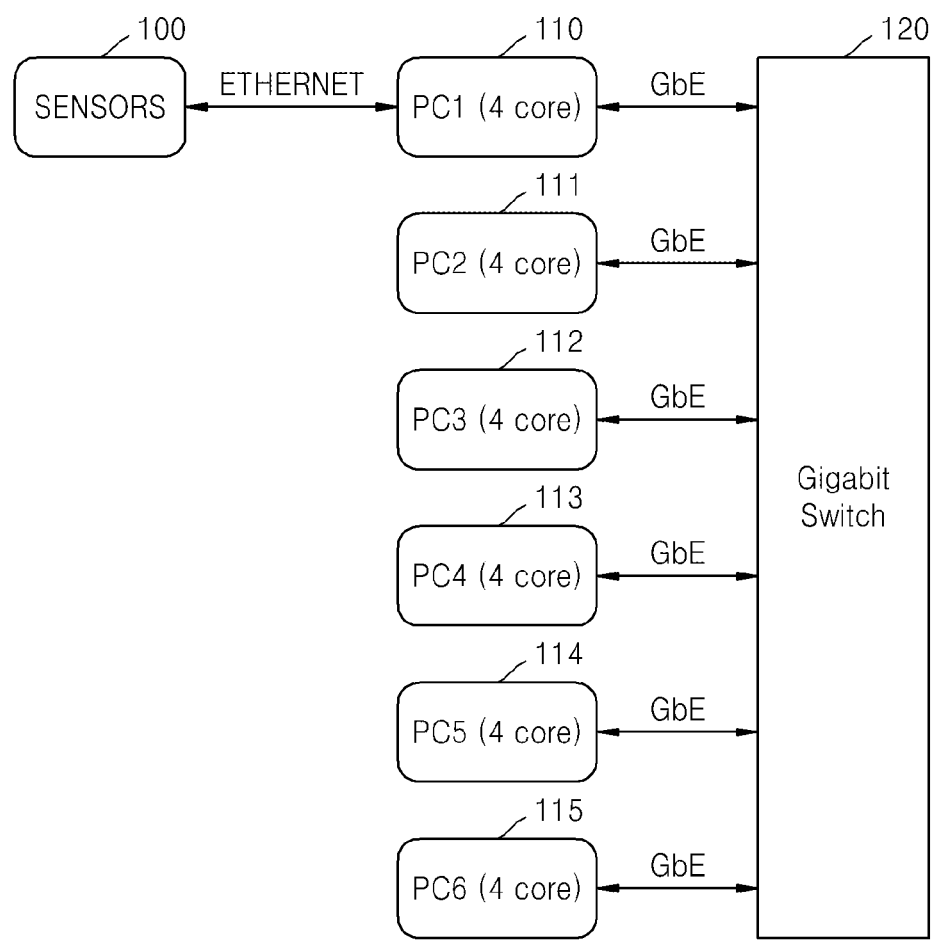
FIG. 1 illustrates a conventional controller.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Throughout the specification, a singular form may include plural forms, unless there is a particular description contrary thereto. Also, terms such as "comprise" and/or "comprising" are used to specify existence of a recited form, a number, a process, an operations, a component, and/or groups thereof, not excluding the existence of one or more other recited forms, one or more other numbers, one or more other processes, one or more other operations, one or more other components and/or groups thereof.

Unless expressly described otherwise, all terms including descriptive or technical terms which are used herein should be construed as having meanings that are obvious to one of ordinary skill in the art. Also, terms that are defined in a general dictionary and that are used in the following description should be construed as having meanings that are equivalent to meanings used in the related description, and unless expressly described otherwise herein, the terms should not be construed as being ideal or excessively formal.

Figure 2:
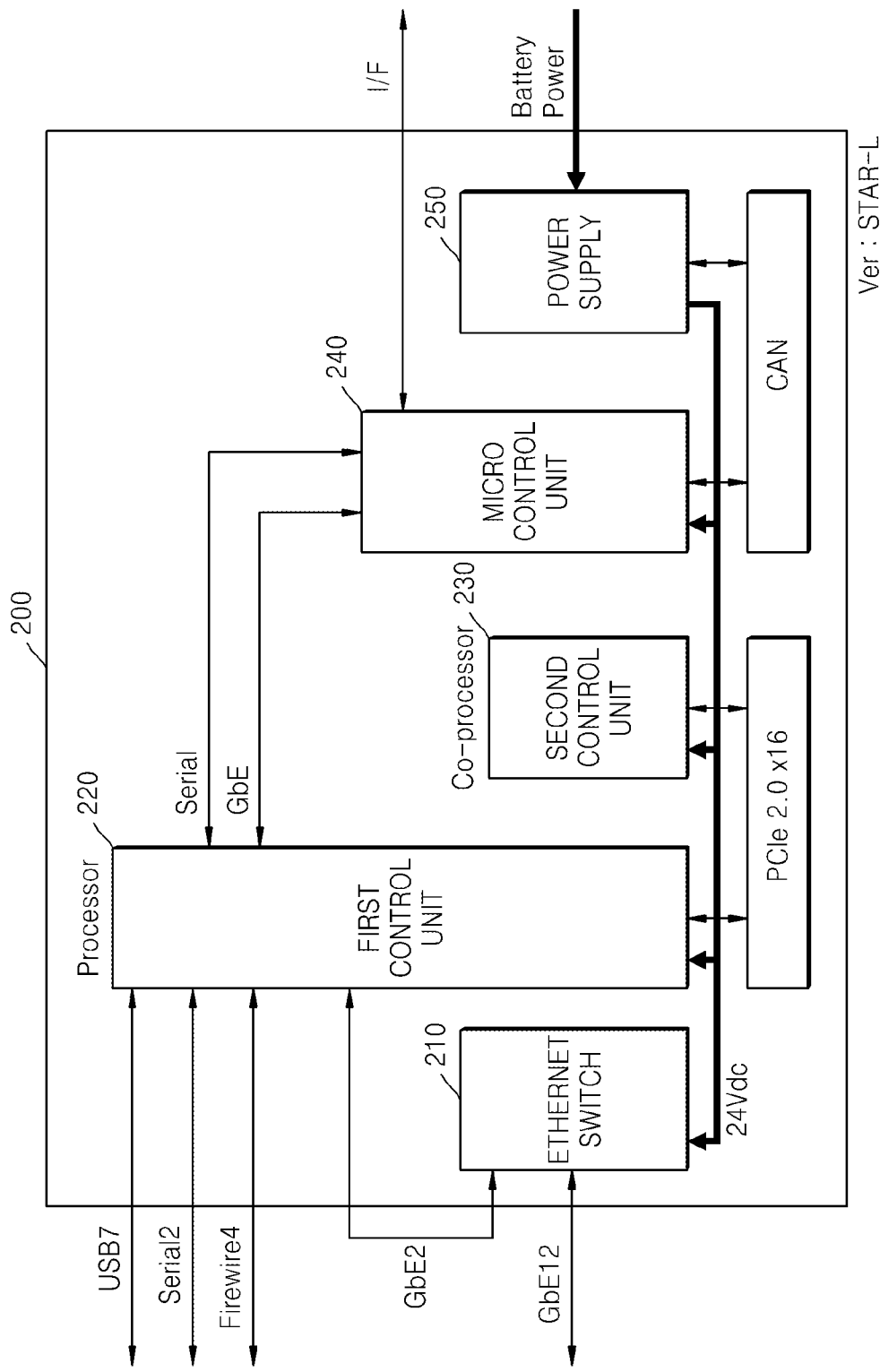
FIG. 2 illustrates a mini integrated control device according to an embodiment of the present invention.

FIG. 2 illustrates a mini integrated control device according to an embodiment of the present invention. Mini integrated control devices illustrated in FIGS. 2 and 3 may be applied to a large-sized robot controller for autonomous vehicles satisfying requirements of level 7 or greater. Level 7 or greater, with respect to autonomous vehicles, indicates functions of self-selecting a travel path at a high speed and self-driving to a destination while avoiding obstacles.

A mini integrated control device 200 includes a gigabit Ethernet (GbE) switch 210, a first control unit 220, a second control unit 230, a micro control unit 240, and a power supply 250.

The GbE switch 210 receives a variety of sensor signals and transmits the signals to the first control unit 220 via GbE.

The first control unit 220 receives large-scale sensor data and performs calculations of the data in parallel. For example, the first control unit 220 performs large-scale calculations in parallel based on location data of the autonomous driving robot and data regarding obstacles located near the autonomous driving robot, which may be acquired from the large-scale sensor data to establish a travel path for autonomous driving such that the autonomous driving robot selects the travel path and travels to the destination while avoiding obstacles.

Examples of the large-scale sensor data may include omni directional RADAR sensor information, 2D and 3D RADAR distance information, and camera image information which are generated during operation of the autonomous driving robot.

The second control unit 230 uses the same clock as the first control unit 220 and is connected to the first control unit 220 to perform calculations of the large-scale sensor data in parallel together with the first control unit 220.

The second control unit 230 performs, in parallel, calculations of data acquired by sensors that recognize the surrounding environment such as a camera or a laser scanner among the large-scale calculations performed by the first control unit 220. Alternatively, the second control unit 230 may also perform, in parallel, calculations for optimizing the parallel process among calculations of the large-scale sensor data performed by the first control unit 220.

The micro control unit 240 monitors the state of power of the robot, monitors obstacles near the robot, controls a motor of the robot, controls a relay module of the robot, and communicates with the first control unit 220. The micro control unit 240 primarily communicates with the first control unit 220 over Ethernet and secondarily communicates with the first control unit 220 over RS232 if the Ethernet is damaged.

In addition, the micro control unit 240 displays a current state of the mini integrated control device, such as a monitored state of power of the robot, a monitored state of obstacles located near the robot, a control state of a motor of the robot, a control state of the relay module of the robot, and a communication state with the first control unit, on a liquid crystal display (LCD) display. An interface of the micro control unit 240 will be described with reference to FIG. 14.

The power supply 250 controls supply of power to sensors used in the robot, the first control unit 220, the second control unit 230, and the micro control unit 240.

Figure 3:
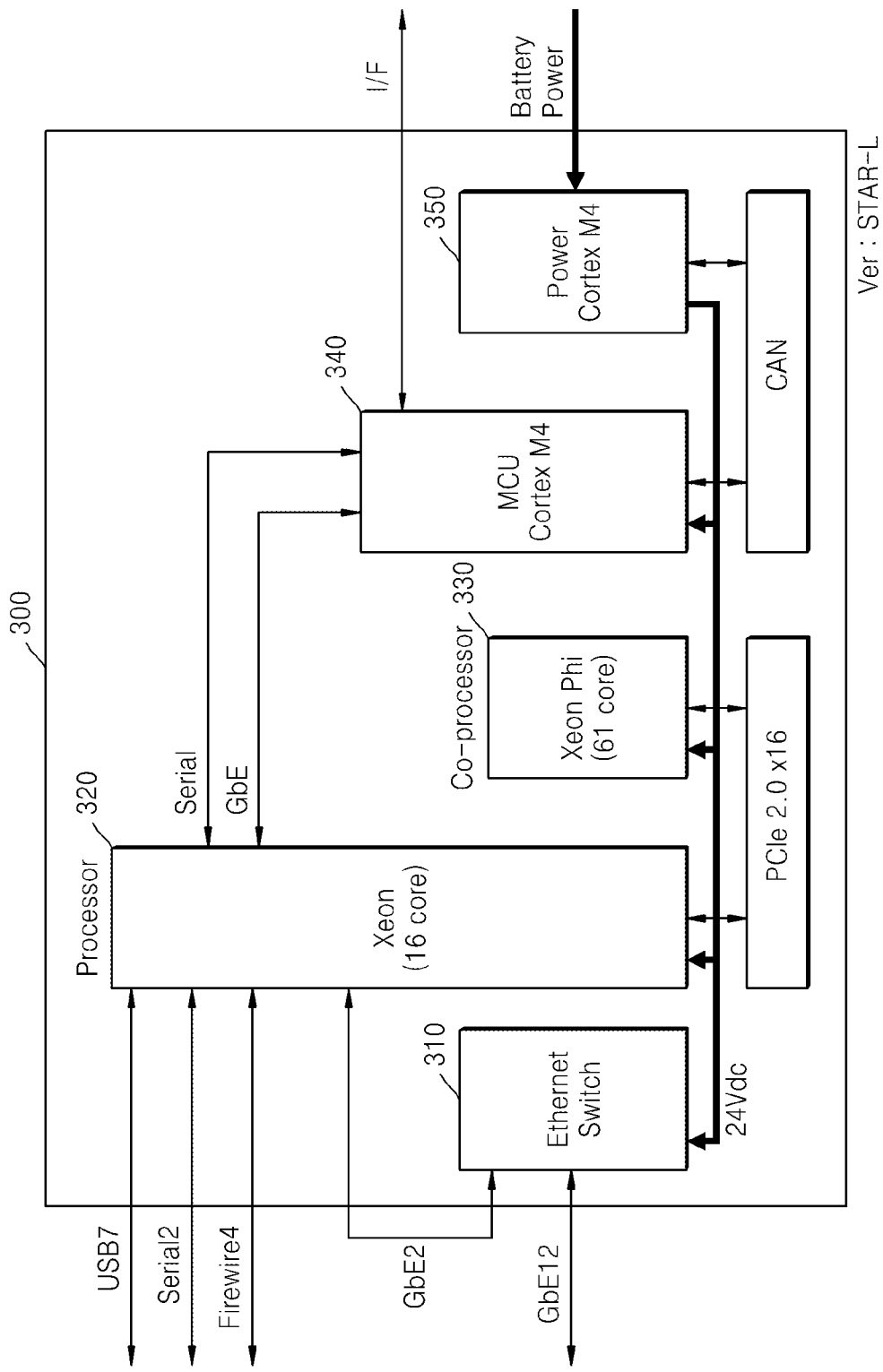
FIG. 3 illustrates a mini integrated control device according to an embodiment of the present invention.

FIG. 3 illustrates a mini integrated control device 300 according to an embodiment of the present invention.

The mini integrated control device 300 illustrated in FIG. 3 is an example of an autonomous driving robot having functions of selecting a travel path at a high speed and traveling to a destination while avoiding obstacles.

The mini integrated control device 300 includes a GbE switch 310, a first control unit 320, a second control unit 330, a micro control unit 340, and a power supply 350.

According to an embodiment, FIG. 3 illustrates a Xeon processor board as the first control unit 320, a Xeon Phi co-processor as the second control unit 330, a Micro Control Unit (MCU) board as the micro control unit 340, and a power supply board 350 is used.

The Xeon processor board 320 that is a higher level controller may include two server-grade Xeon central process units (CPUs) (each having 8 cores). Thus, the Xeon processor board 320 may include 16 cores in total and may also be operated on 32 cores in total by hyper-threading. Since a system conventionally including a plurality of personal computers (PCs) and a GbE Switch may be implemented on a single board according to the current embodiment, loss of the large-scale sensor data through the GbE may be thoroughly prevented.

The Xeon processor board 320 is connected to the Xeon Phi co-processor 330 via peripheral component interconnect express (PCIe) of a backplane. The Xeon Phi co-processor 330, which is a co-processor in which 61 1.053 GHz cores are integrated, serves to process large-scale data. Since the PCIe has a data transmission rate of 8 GB/s, the data transmission rate of the system is improved by 164 times even on the assumption that an actual data transmission rate is 80% upon comparison with the conventional system of FIG. 1 connected through GbE, which has an actual data transmission rate of 50 MB/s.

The MCU board 340 is a lower level controller that processes simple signals from sensors located near a robot driving unit or a system fault. The MCU board 340 communicates with the Xeon processor board 320, which is a higher level controller, over Ethernet as a main communication method and over RS232 as a sub communication method. Thus, RS232 is used during an early stage of development, and Ethernet is used after porting an operating system (OS). If the Ethernet is damaged while operating the system, functions of the Ethernet are replaced by those of RS232, which is a sub communication method. The Ethernet and RS232 of the MCU board 340 are connected to the Xeon processor board 320 via the backplane. Alternatively, the MCU board 340 is connected to the power board 350 via CAN communication so as to control subsequent operations for the peripheral devices according to the state of power and the state of faults.

The power supply board 350 is operated by a battery voltage of 24 V applied thereto. The power supply board 350 having a maximum capacity of 2.5 kW supplies power to various boards in the controller, supplies power to a heater, supplies power to a heat-dissipation devices, and supplies power to external sensors.

Figure 4:
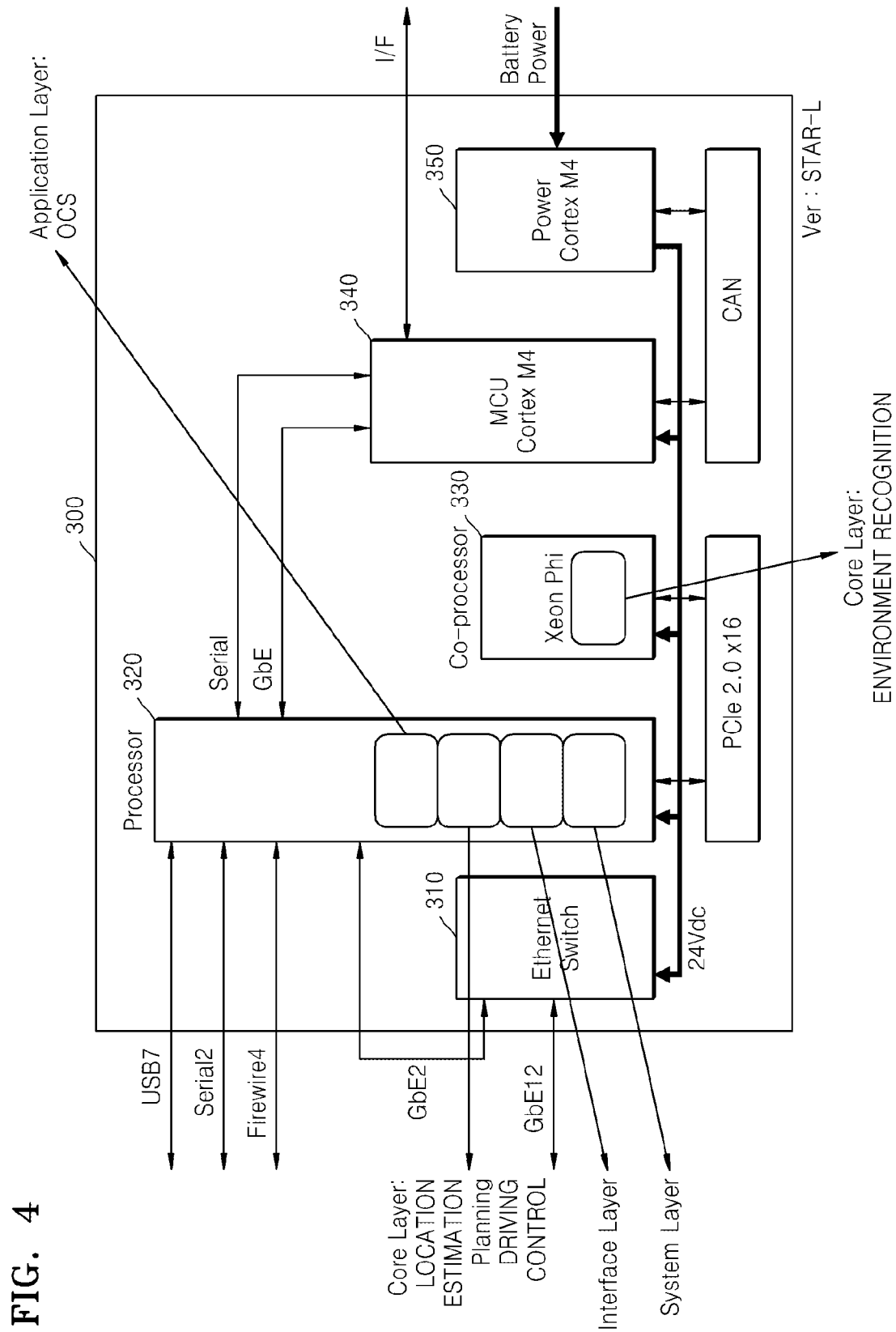
FIG. 4 illustrates an inner structure of the mini integrated control device of FIG. 2 or 3 according to an embodiment of the present invention.

FIG. 4 illustrates an inner structure of the mini integrated control device of FIG. 2 or 3 according to an embodiment of the present invention.

The Xeon processor board 320 mainly provides a system layer, an interface layer, a core layer, and an application layer. Each of the layers will be described later with reference to FIG. 5.

The Xeon Phi co-processor 330 provides a core layer that detects and traces moving obstacles and performs environment recognition such as laser-based environment recognition. In addition, the Xeon Phi co-processor 330 may be implemented to process parts for optimizing parallel processing. The parallel processing may be performed by the co-processor when a planning SW is run in parallel in grid layout.

Figure 5:
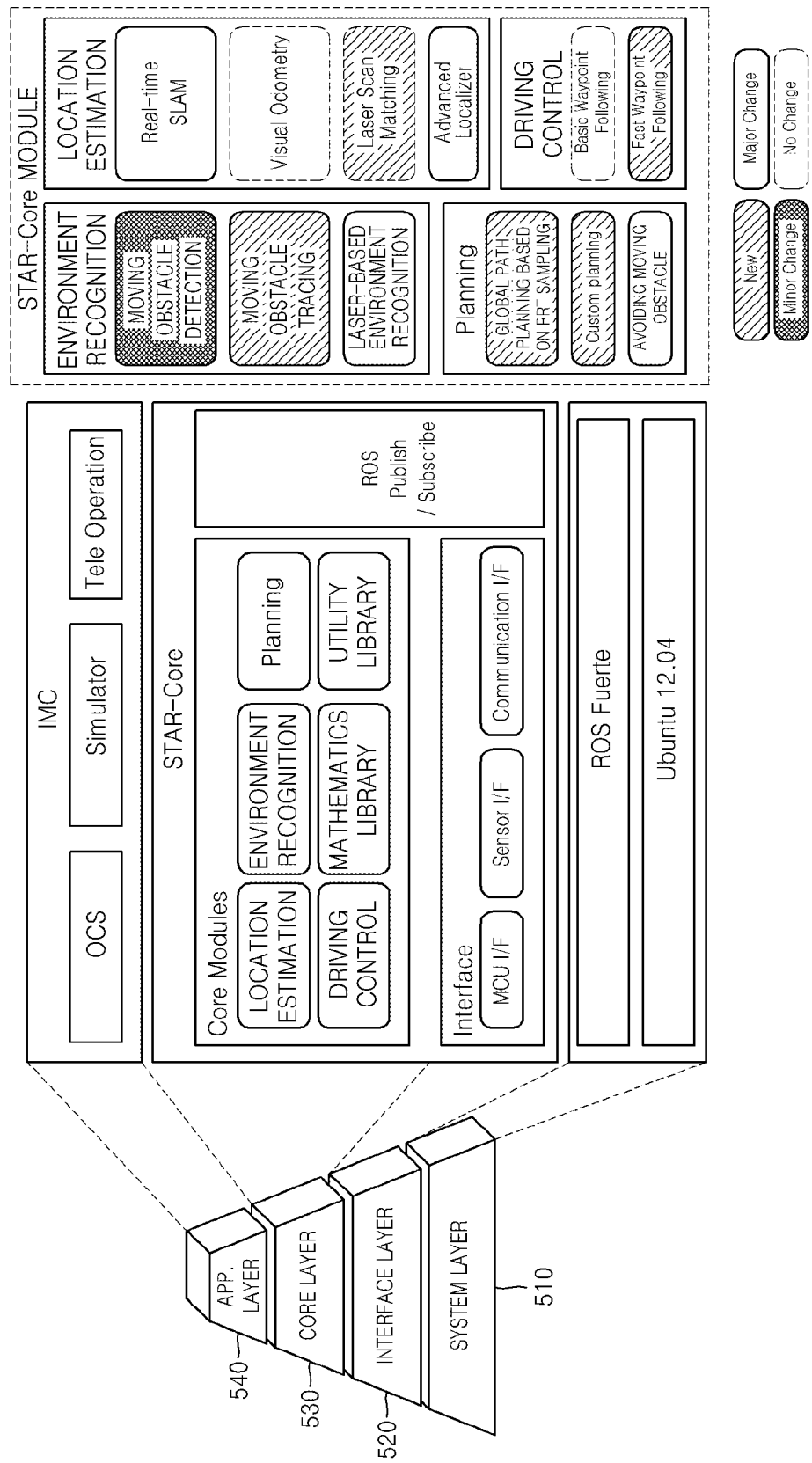
FIG. 5 illustrates an inner structure of each layer of a mini integrated control device according to an embodiment of the present invention.

FIG. 5 illustrates an inner structure of each layer of a mini integrated control device according to an embodiment of the present invention.

According to the current embodiment, the mini integrated control device provides a system layer 510, an interface layer 520, a core layer 530, and an application layer 540 as illustrated in FIG. 5.

The system layer 510 includes an OS and middleware for driving application software of the robot. Linux OS may be mounted therein as the OS, and Robot Operating System (ROS)-based middleware is mounted as the middleware. However, any other middleware, which performs communication between nodes of the application software of the robot, process execution, and resource management, may also be mounted therein. Since the system layer is separated, development of robots may be focused on algorithms.

The interface layer 520 provides an MCU interface, a sensor interface, and a communication interface. The core layer 530 provides location estimation such as real-time detection of moving objects, sight distance detection, and laser scan matching, environment recognition such as detection and tracing of moving obstacles and laser-based environment recognition, planning such as global path planning based on RRT sampling, custom planning, and avoiding moving obstacles, driving control such as basic waypoint following and fast waypoint following, a mathematics library, and a utility library.

Figure 6:
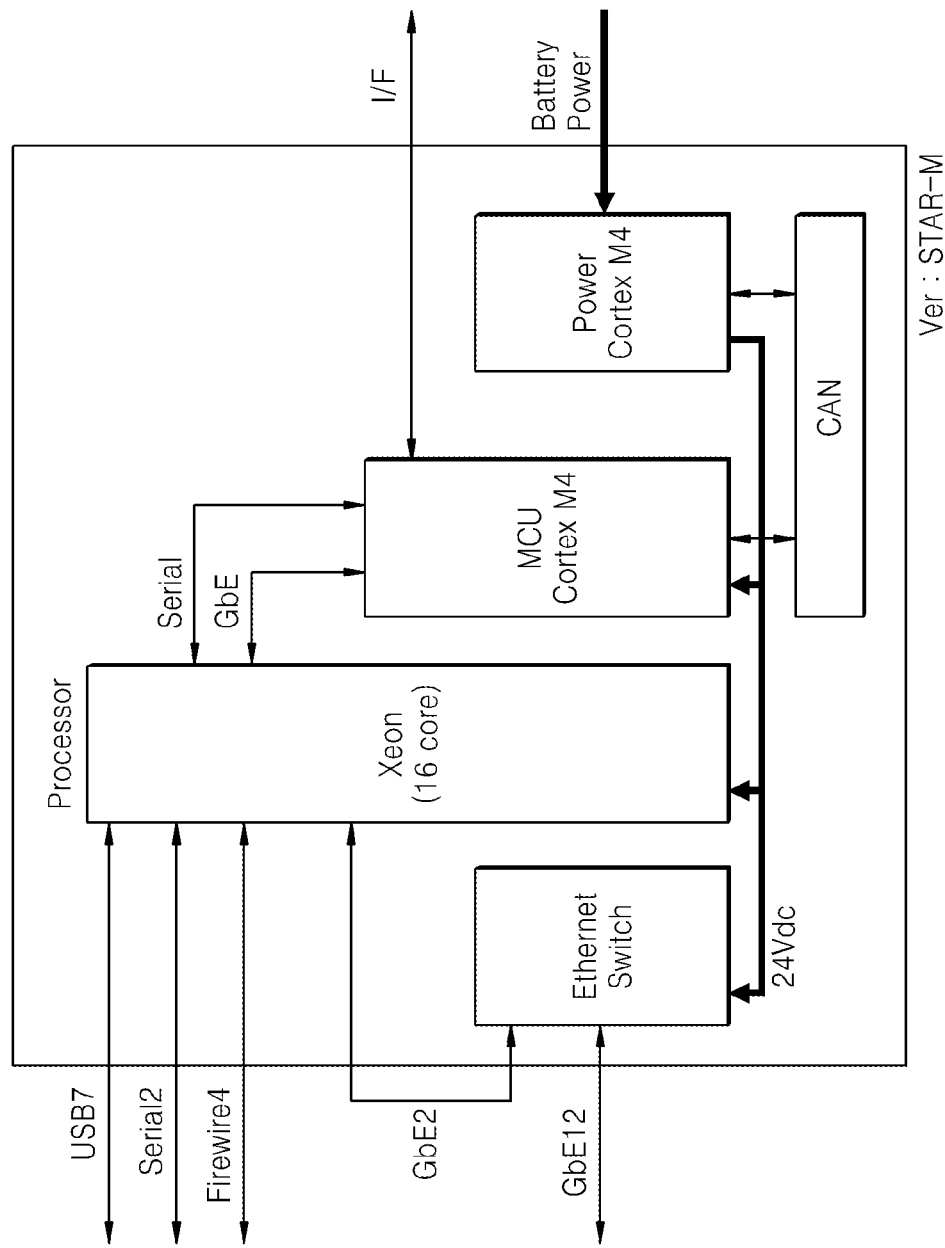
FIG. 6 illustrates a mini integrated control device used in a medium-sized robot according to another embodiment of the present invention.

FIG. 6 illustrates a mini integrated control device used in a medium-sized robot according to another embodiment of the present invention. That is, the mini integrated control device is used in a medium-sized robot capable of self-selecting a travel path and self-driving to a destination while avoiding obstacles although a velocity is low (satisfying level 6 or less autonomous vehicle requirements).

The medium-sized robot does not need a large-scale sensor such as omni directional RADAR and cannot perform high-velocity driving unlike commercial vehicles, and thus the mini integrated control device illustrated in FIG. 6 does not include the second control unit 230 and the backplane illustrated in FIG. 2.

Figure 7:
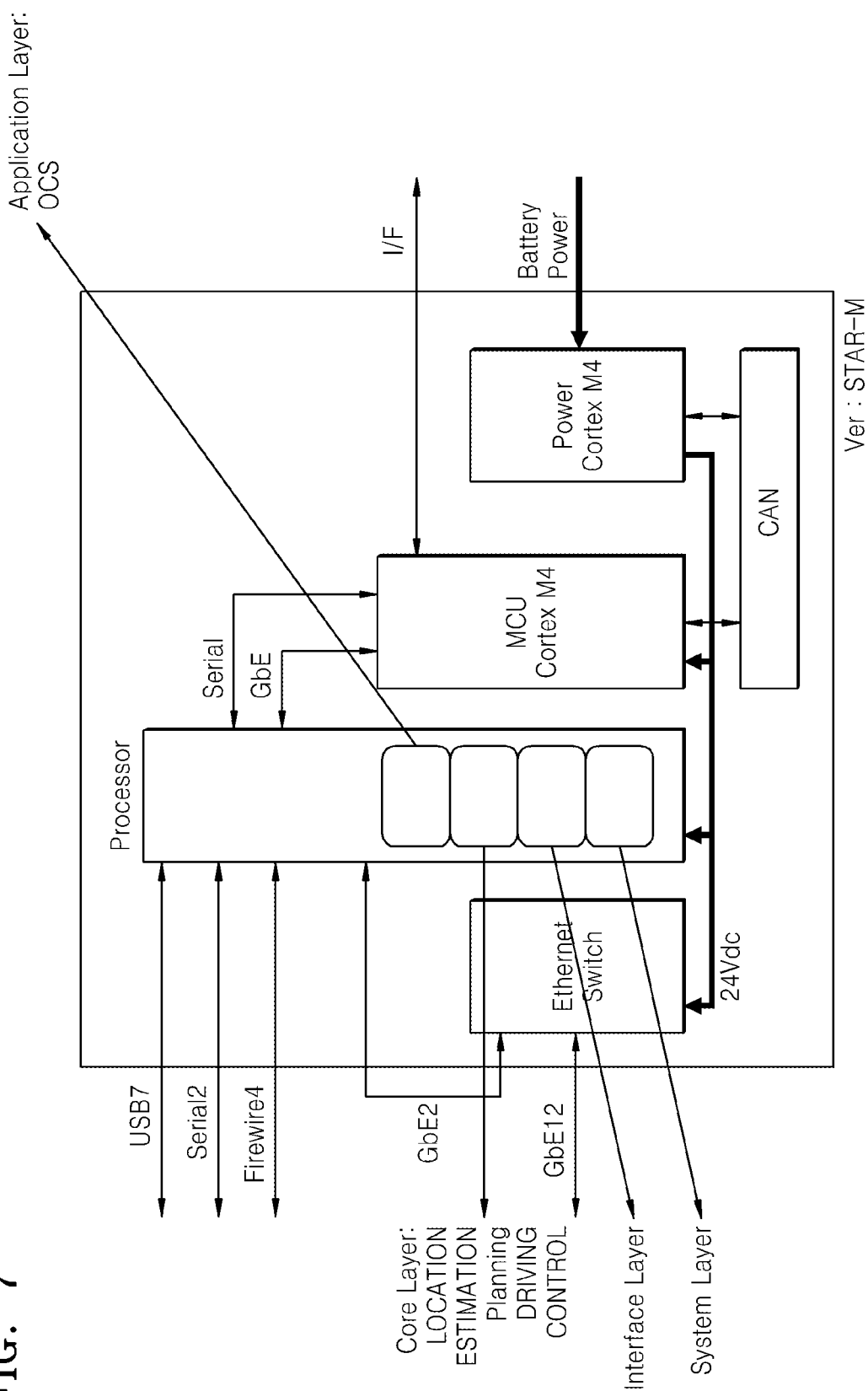
FIG. 7 illustrates a mini integrated control device used in a medium-sized robot and including the layers illustrated in FIG. 5 according to another embodiment of the present invention.

FIG. 7 illustrates a mini integrated control device used in a medium-sized robot and including the layers illustrated in FIG. 5 according to another embodiment of the present invention. Since the structure illustrated in FIG. 7 does not include a second control unit (co-processor), basic environment recognition may only be possible (level 6 autonomous vehicle requirements).

As a result, the environment recognition function performed by the second control unit (co-processor) of FIG. 4 is migrated to the first control unit (main-processor), and thus execution speed of other software is reduced to low velocity driving of the medium-sized robot.

Figure 8:
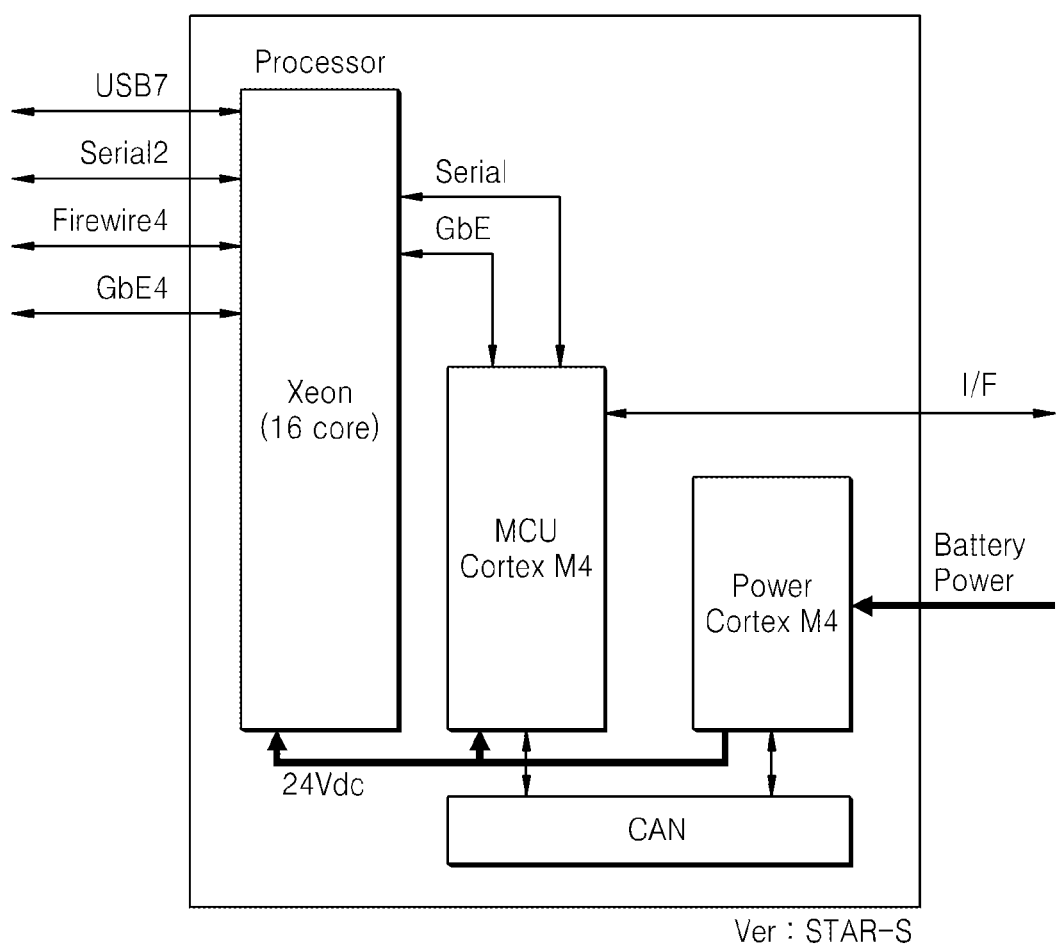
FIG. 8 illustrates a mini integrated control device used in a small-sized robot according to another embodiment of the present invention.

FIG. 8 illustrates a mini integrated control device used in a small-sized robot according to another embodiment of the present invention. Since the small-sized robot has a small number of sensors, the structure of FIG. 8 does not include the second control unit 230, the backplane, or the GbE switch illustrated in FIG. 2.

Figure 9:
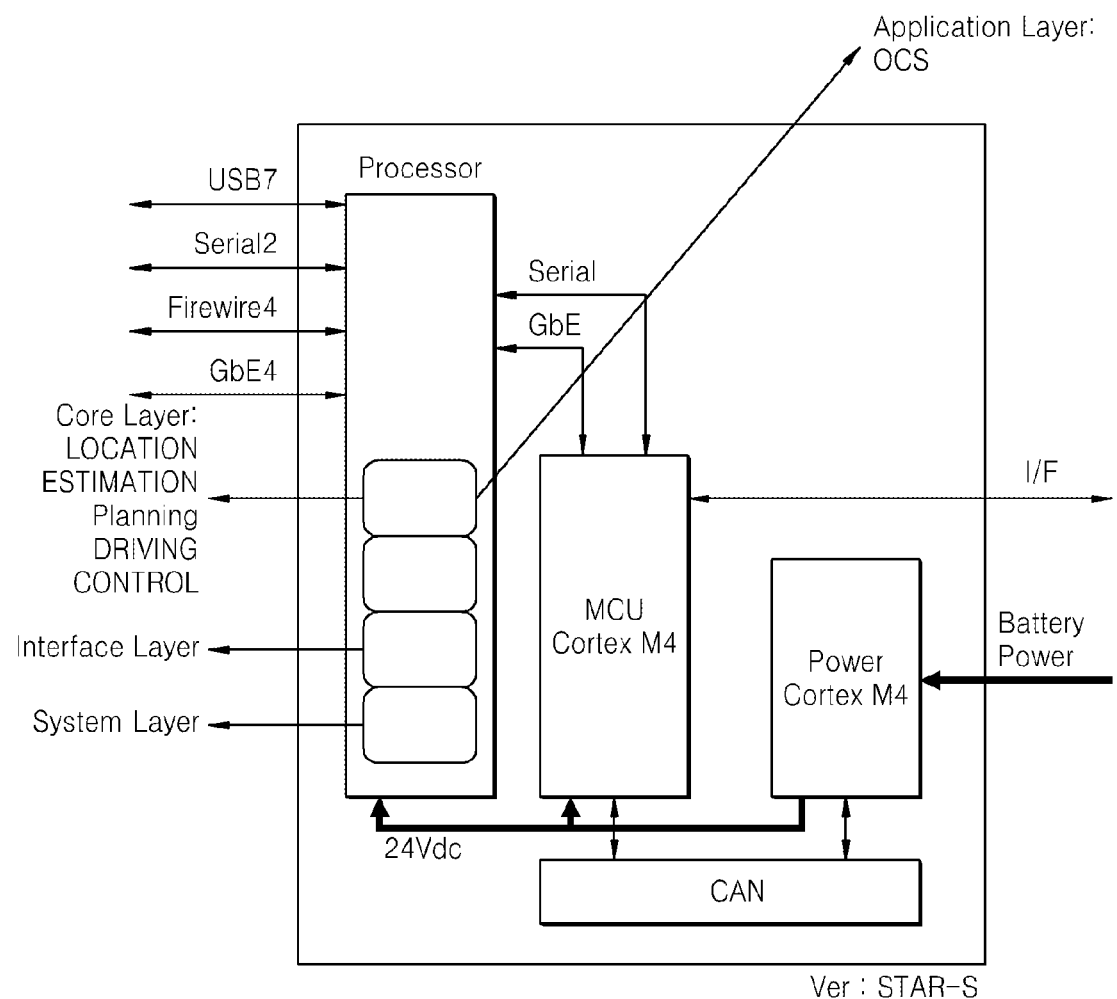
FIG. 9 illustrates a mini integrated control device used in a small-sized robot and including the layers illustrated in FIG. 5 according to another embodiment of the present invention.

FIG. 9 illustrates a mini integrated control device used in a small-sized robot and including the layers illustrated in FIG. 5 according to another embodiment of the present invention.

The structure illustrated in FIG. 9 does not include environment recognition SW and thus, environment recognition is not performed.

In this case, the small-sized robot travels to a destination along a designated travel path when the destination is provided. That is, the small-sized robot may perform location estimation using a global positioning system (GPS), an inertial measurement unit (IMU), or a laser scanner only when an environment map is provided, and travels using the estimated location information and designated travel path information (level 5 autonomous vehicle requirements).

Figure 10:
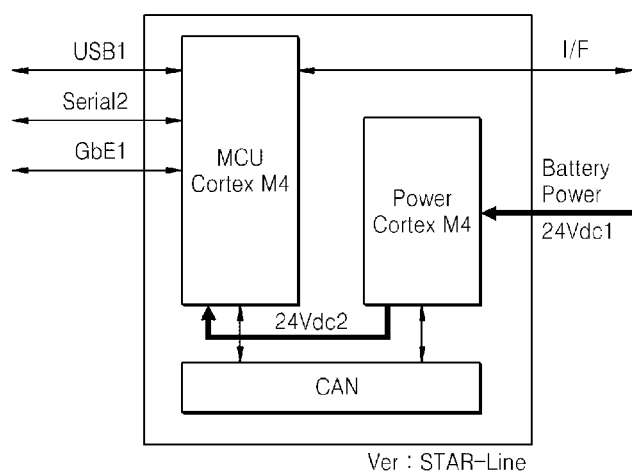
FIG. 10 illustrates a mini integrated control device used in a small line tracer according to another embodiment of the present invention.

FIG. 10 illustrates a mini integrated control device used in a small line tracer according to another embodiment of the present invention.

Figure 11:
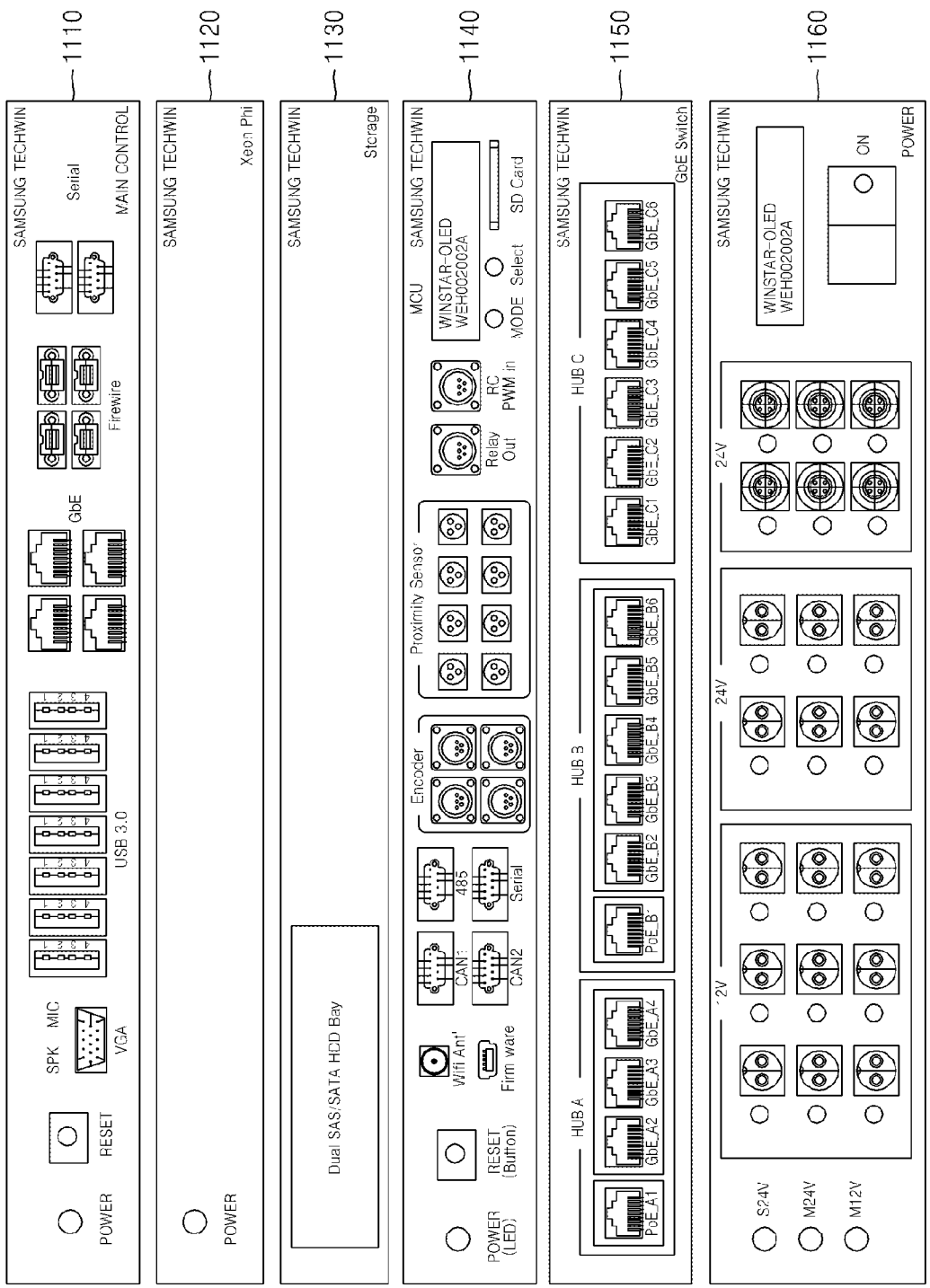
FIG. 11 illustrates a structure of a front panel of the mini integrated control device of FIG. 2 used in an autonomous driving robot.

FIG. 11 illustrates a structure of a front panel of the mini integrated control device of FIG. 2 used in an autonomous driving robot.

The front panel includes a 6 U size rack type structure coupled to a backplane provided with a connector with high vibration resistance, such as a Compact PCI (CPCI) connector, via slots. The front panel includes a Xeon processor board (main board) 1110, a Xeon Phi 1120, a solid state drive (SSD) 1130, an MCU 1140, a GbE switch 1150, and a power board 1160. According to another embodiment, the Xeon Phi 1120 and the SSD 1130 may be mounted in an Ethernet switch blade.

Figure 12:
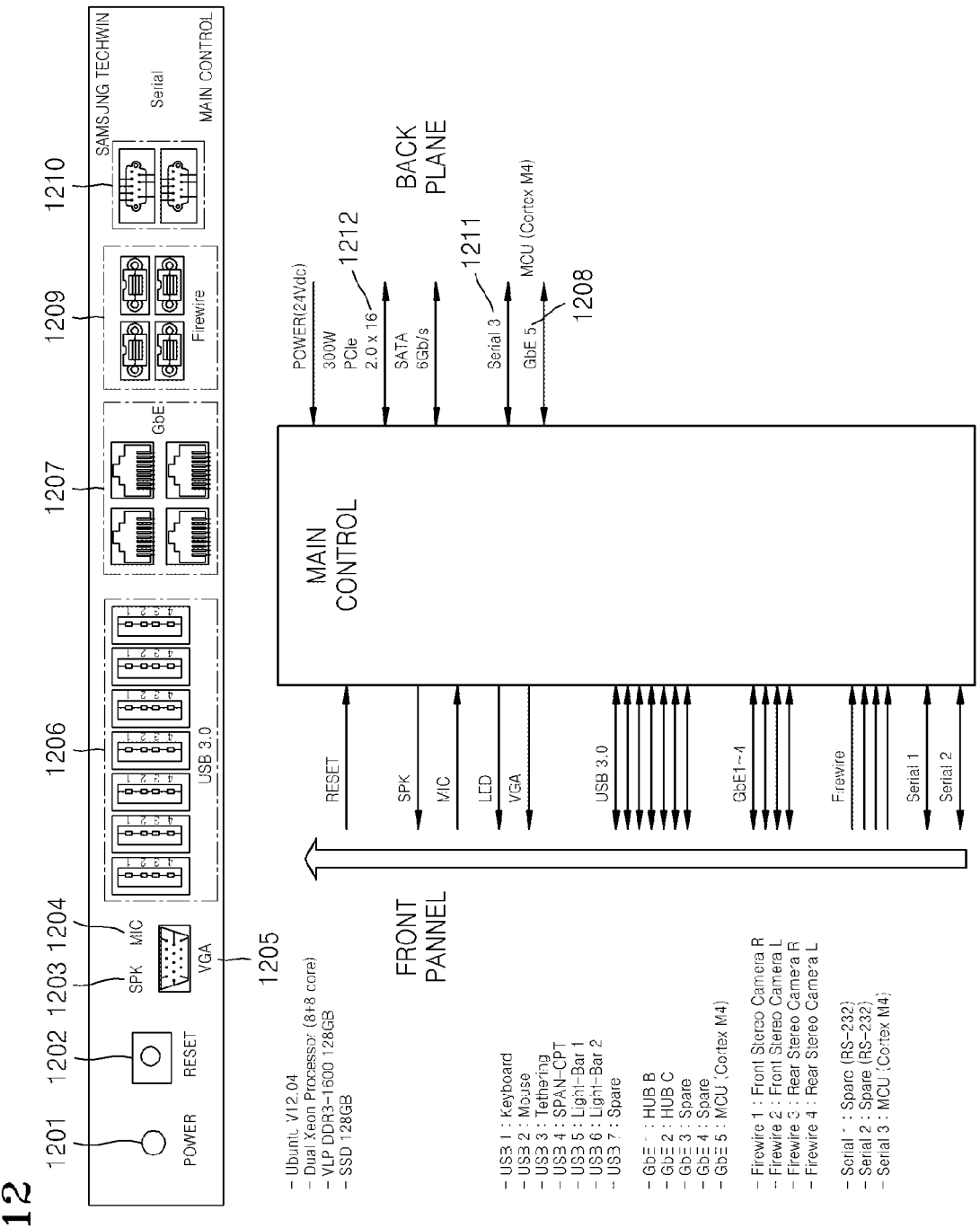
FIG. 12 illustrates a structure of a Xeon processor board in detail.

FIG. 12 illustrates a structure of a Xeon processor board 1110 in detail. Communication lines, which need to be always connected, are disposed at a backplane side, and communication lines, which are frequently modified according to combinations of external sensors, are disposed at a front panel side. The configuration of the front panel side and the backplane side includes 7 USB ports and connecting devices are as follows.

Power LED 1 1201
Reset Button 1202
Speaker connector 1203
Microphone 1 1204
VGA or HDMI 1205
USB 1: Keyboard 1206
USB 2: Mouse 1206
USB 3: Tethering 1206
USB 4: SPAN-CPT 1206
USB 5: Light-Bar 1 1206
USB 6: Light-Bar 2 1206
USB 7: Spare 1206
GbE 1: Switch B 1207
GbE 2: Switch C 1207
GbE 3: Spare (3D LADAR) 1207
GbE 4: Spare 1207
GbE 5: MCU (Cortex M4) 1208
FireWire 1: Front Stereo Camera R 1209
FireWire 2: Front Stereo Camera L 1209
FireWire 3: Rear Stereo Camera R 1209
FireWire 4: Rear Stereo Camera L 1209
Serial 1: Spare (RS232) 1210
Serial 2: Spare (RS232) 1210
Serial 3: MCU (Cortex M4) 1211
PCIe 1212

The PCIe 1212 connected to the Xeon Phi, Serials 1, 2, and 3 connected to the MCU, and Ethernet switches are disposed at the backplane side.

Figure 13:
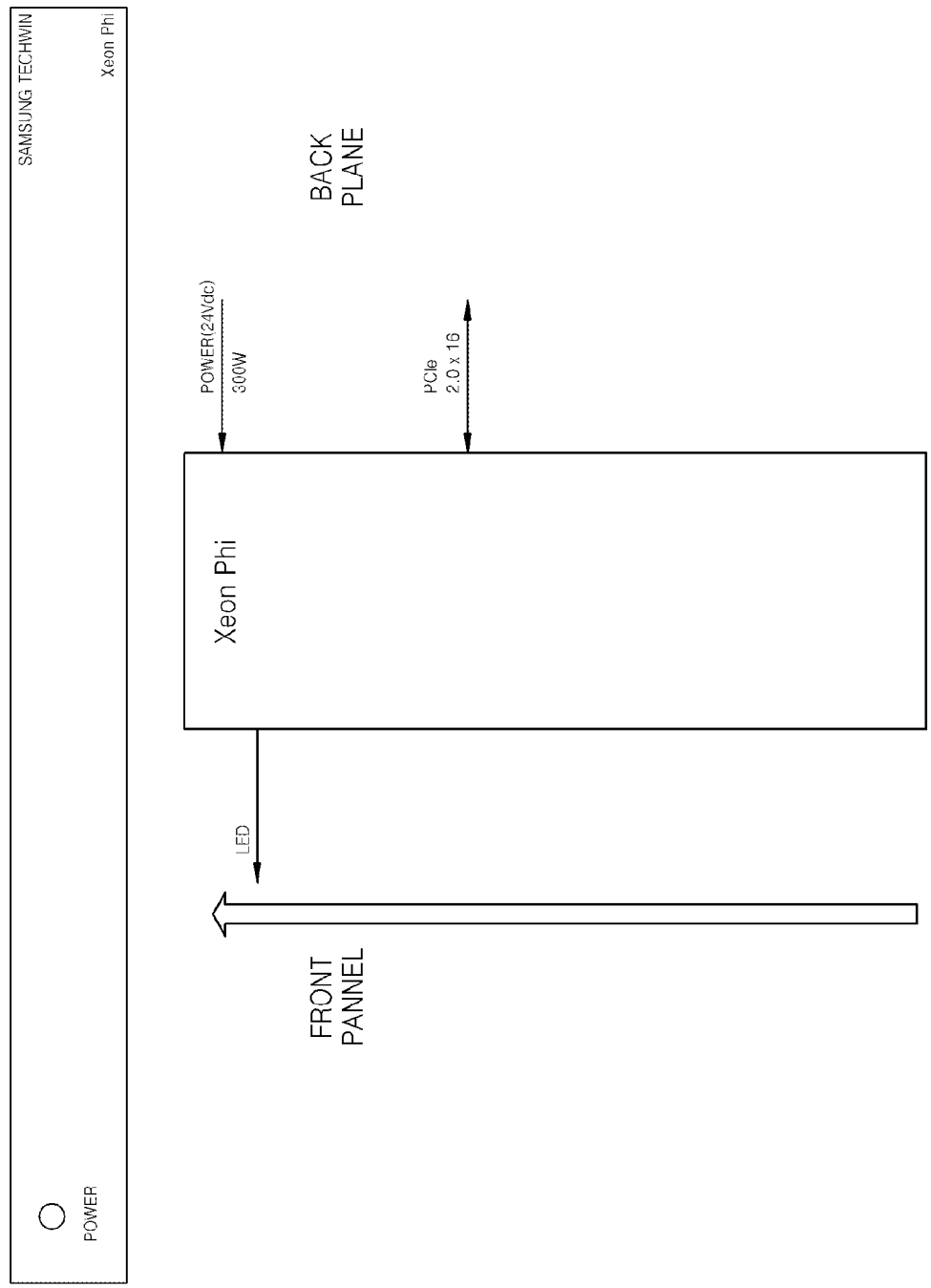
FIG. 13 illustrates a structure of a Xeon Phi Board in detail.

FIG. 13 illustrates a structure of a Xeon Phi Board in detail. The Xeon Phi is connected to the Xeon processor board via the PCIe through the backplane.

Figure 14:
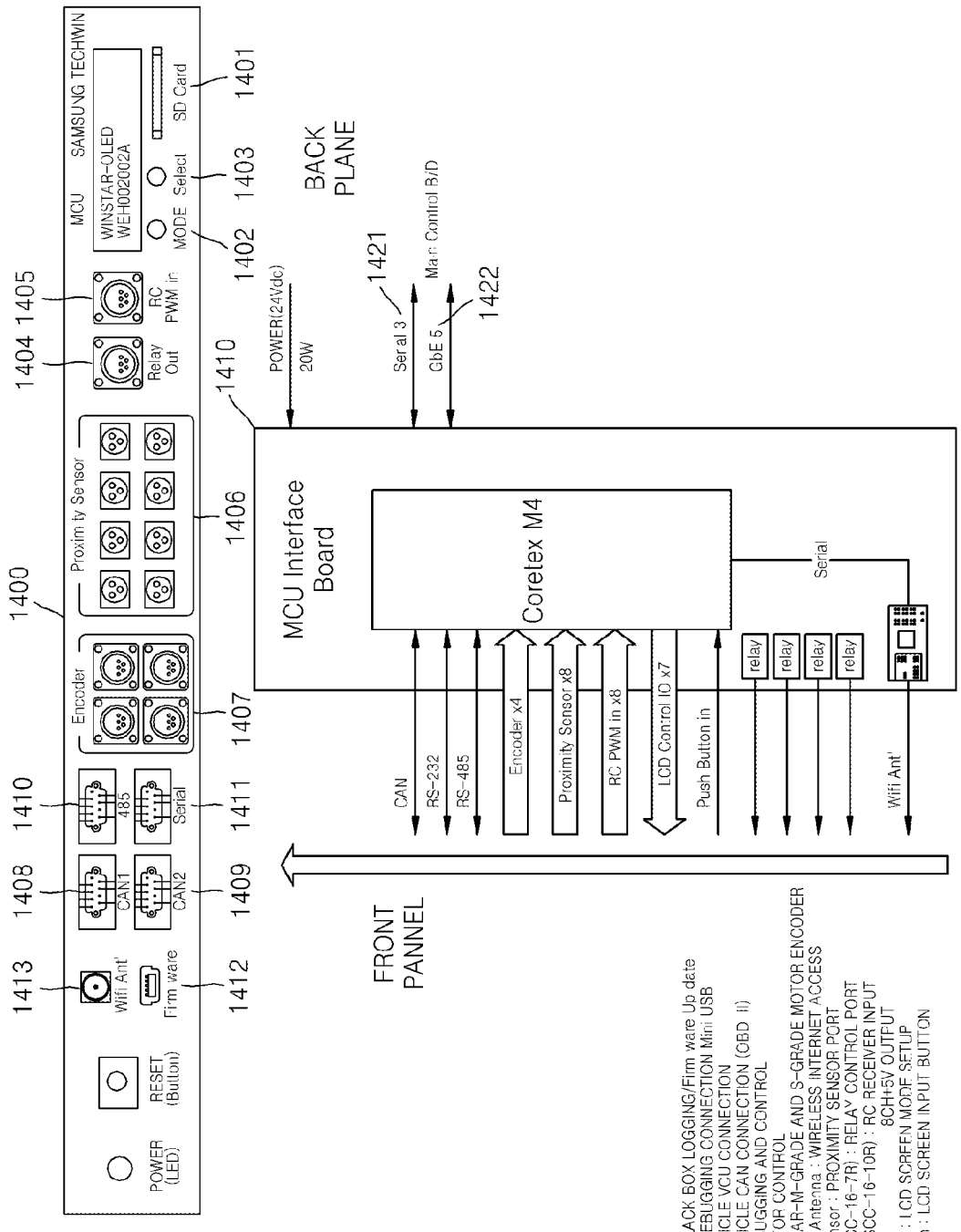
FIG. 14 illustrates a structure of a micro control unit (MCU) interface of a mini integrated control device according to an embodiment of the present invention in detail.

FIG. 14 illustrates a structure of a micro control unit (MCU) interface of a mini integrated control device according to an embodiment of the present invention in detail.

The MCU board 1410 may have a structure satisfying all requirements of large, medium, and small-sized controllers so that the controllers may be manufactured in series such as large, medium, and small-sized controllers according to the size and use of the robot. The MCU board 1410 that is connected to the power board via CAN communication through the backplane takes action according to the status of power, detects obstacles nearby, controls a motor, inputs a signal to an RC controller, implements wireless (Wi-Fi) communication, controls various relay modules, and includes a protective circuit. The MCU board 1410 displays the current status of the system on an LCD.

Referring to FIG. 14, the configuration of the front panel 1400 of the MCU board 1410 is as follows.

Figure 15:
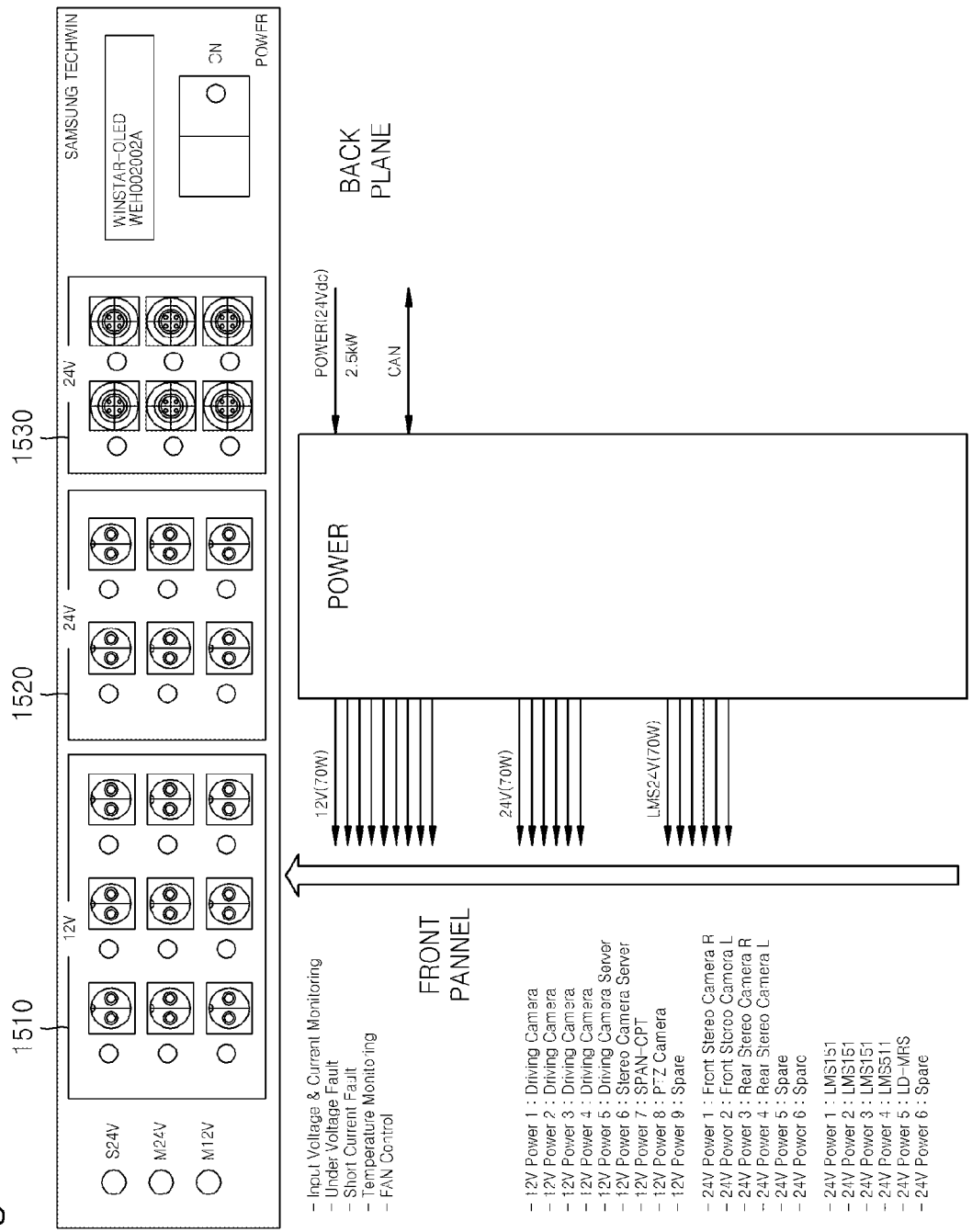
FIG. 15 illustrates a structure of a power board according to an embodiment of the present invention in detail.

SD Card 1401: Black Box logging/Firmware Update
Mode Button 1402: LCD Screen Mode Setup
Select Button 1403: LCD screen Menu Input
Relay Out 1404: 4CH Relay Port
RC PWM 1405: 8CH RC Receiver, 5V Output
Proximity Sensor 1406: Proximity Sensor Input
Encoder 4CH 1407: Motor Encoder Input
CAN1 1408: Vehicle VCU connection
CAN2 1409: OBD-II Connection
RS485 1410: Motor Control Reference
RS232 1411: Debugging & Control
Mini-USB 1412: Debugging port
Wireless Wi-Fi Antenna 1413: Wireless Internet Access Antenna The configuration of the backplane side is as follows.
RS232 1421: Connected to Main (Xeon) Board
Ethernet 1422: Connected to Main (Xeon) Board FIG. 15 illustrates a structure of a power board according to an embodiment of the present invention in detail.

Sensor power is supplied via 12V 9 channels, 24V 6 channels, and laser measurement (LMS) sensor exclusive 24V 6 channels. Each channel of the sensor power supply units may output a maximum capacity of 70 W. Each channel of the sensor power supply units may be turned on and off by a hardware switch. The MCU board may also turn on and off each channel using software via controller area network (CAN) communication.

The ON/OFF state of each channel may be detected by the MCU. Furthermore, in sub-zero driving conditions, an internal temperature of the controller may be raised to room temperature using a heater and a fan mounted therein. Information regarding a power state may be displayed on the LCD screen. The configuration of each power channel is as follows.

12V Power 1: Power of Driving Camera 1510
12V Power 2: Power of Driving Camera 1510
12V Power 3: Power of Driving Camera 1510
12V Power 4: Power of Driving Camera 1510
12V Power 5: Power of Driving Camera Server 1510
12V Power 6: Power of Stereo Camera Server 1510
12V Power 7: Power of SPAN-CPT 1510
12V Power 8: Power of PTZ Camera 1510
12V Power 9: Spare 1510
24V Power 1: Power of Front Stereo Camera R 1520

24V Power 2: Power of Front Stereo Camera L 1520
24V Power 3: Power of Rear Stereo Camera R 1520
24V Power 4: Power of Rear Stereo Camera R 1520
24V Power 5: Spare (Monitor) 1520
24V Power 6: Spare 1520
LMS 24V Power 1: Power of LMS151 1530
LMS 24V Power 2: Power of LMS151 1530
LMS 24V Power 3: Power of LMS151 1530
LMS 24V Power 4: Power of LMS511 1530
LMS 24V Power 5: Power of LD-MRS 1530
LMS 24V Power 6: Spare 1530

Figure 16:
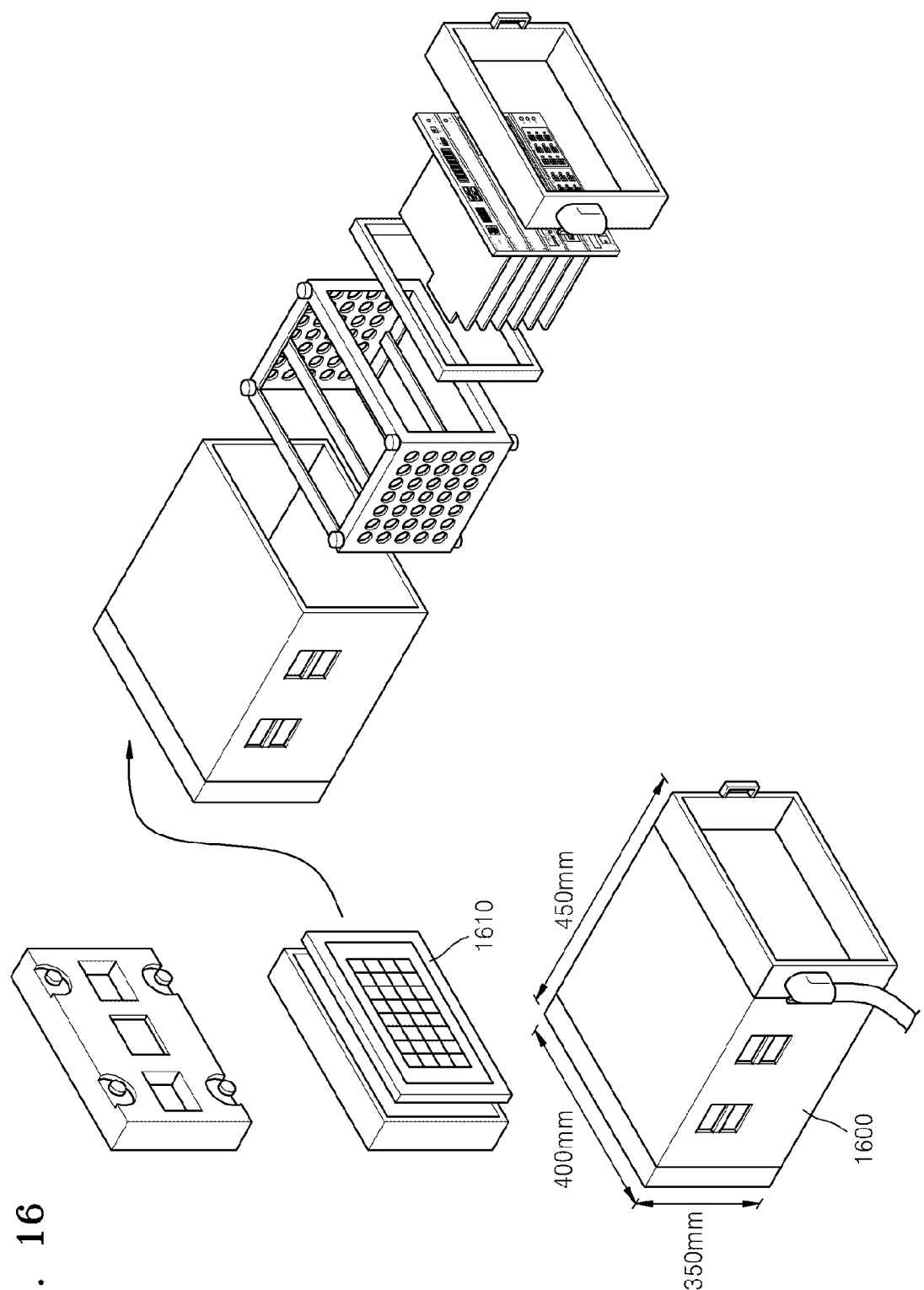
FIG. 16 illustrates a structure of a case of a mini integrated control device according to an embodiment of the present invention.

FIG. 16 illustrates a structure of a case of a mini integrated control device according to an embodiment of the present invention.

A case 1600 of a mini integrated control device has a structure resistant to dust, vibration, and impact. An air conditioner 1610 may be mounted therein to block external dust in a fully shielded structure and to control temperature during overheating of the controller. In sub-zero driving conditions, the internal temperature of the controller may be raised to room temperature using a heater and a fan mounted therein.

Alternatively, vibration of a vehicle may be reduced by mounting rubber dampers at corners of inner frames of the case 1600 of the mini integrated control device. Reinforced acryl is mounted at a front cover in the form of a door such that information of a front panel of the mini integrated control device may be identified from the outside of the case 1600.

Alternatively, a power line and a signal line connected to the front panel may protrude through tubes. The tubes may be fastened by metallic cable ties so that the controller is protected from external dust and moisture. Accordingly, the case is designed to acquire IP65 certification.

As described above, according to the one or more of the above embodiments of the present invention, data processing speed and accuracy of calculations may be improved using the mini integrated control device. In addition, the current state of the system may be identified through an LCD using the mini integrated control device. Furthermore, while a conventional controller has a large volume due to a plurality of PCs connected therein, the mini integrated control device according to the embodiments of the present invention has a reduced volume of 400 mm*450 mm*350 mm.

In addition, other embodiments of the present invention may also be implemented through computer readable code/instructions in/on a medium, e.g., a computer readable medium, to control at least one processing element to implement any of the above described embodiments. The medium may correspond to any medium/media permitting the storage and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. The media may also be a distributed network, so that the computer readable code may be stored/transferred and executed in a distributed fashion. Furthermore, the processing element may include a processor or a computer processor, and processing elements may be distributed and/or included in a single device.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A mini integrated control device comprising at least one processor to implement:
   a first control unit for receiving large-scale sensor data generated while an autonomous driving robot is operated, and performing a first portion of large-scale calculations of the large-scale sensor data, wherein the first control unit calculates a travel path for autonomous driving based on location data of the autonomous driving robot and data regarding obstacles located near the autonomous driving robot acquired from the large-scale sensor data to allow the autonomous driving robot to select the travel path and travel to a destination while avoiding obstacles;
   a second control unit, which is connected to the first control unit, for performing, in parallel with the first portion of the large-scale calculations of the first control unit, a second portion of the large-scale calculations of the large-scale sensor data, by using the same clock as the first control unit, wherein the second control unit performs calculations of data acquired by sensors comprising a camera and a laser scanner; and
   a micro control unit for monitoring a state of power of the autonomous driving robot, monitoring obstacles located near the autonomous driving robot, controlling a motor of the autonomous driving robot, controlling a relay module of the autonomous driving robot, and communicating with the first control unit,
   wherein the mini integrated control device further comprises a power supply configured to supply power to sensors used by the autonomous driving robot, the first control unit, the second control unit, and the micro control unit.

2. The mini integrated control device of claim 1, wherein the first control unit receives the large-scale sensor data via a gigabit Ethernet (GbE) switch.

3. The mini integrated control device of claim 1, wherein the micro control unit communicates with the first control unit over Ethernet and communicates with the first control unit over RS232 if the Ethernet is damaged.

4. The mini integrated control device of claim 1, wherein the micro control unit displays a state of the mini integrated control device comprising a monitored state of power of the autonomous driving robot, a monitored state of obstacles located near the autonomous driving robot, a control state of the motor of the autonomous driving robot, a control state of the relay module of the autonomous driving robot, and a communication state with the first control unit, on a liquid crystal display (LCD) display.

5. The mini integrated control device of claim 1, wherein the first control unit comprises 16 cores and is operated on 32 cores in total by hyper-threading.

6. The mini integrated control device of claim 1, wherein the first control unit is in the form of a board,
   wherein peripheral component interconnect express (PCIe) communication lines connecting the first control unit and the second control unit and serial and Ethernet communication lines connected to the micro control unit are disposed at a backplane side of the board, and a power light emitting diode (LED), a reset button, a speaker connector, a microphone, a video graphics adapter (VGA) or high definition multimedia interface (HDMI), at least one universal serial bus (USB), at least one gigabit Ethernet (GbE) switch, at least one FireWire, and at least one serial communication line are disposed at a front panel side of the board.

7. The mini integrated control device of claim 1, wherein the autonomous driving robot selects the travel path at a high speed and travels to the destination while avoiding obstacles.

8. A mini integrated control device comprising at least one processor to implement:
- a first control unit for receiving large-scale sensor data generated while an autonomous driving robot is operated, and performing a first portion of large-scale calculations of the large-scale sensor data, wherein the first control unit calculates a travel path for autonomous driving based on location data of the autonomous driving robot and data regarding obstacles located near the autonomous driving robot acquired from the large-scale sensor data to allow the autonomous driving robot to select the travel path and travel to a destination while avoiding obstacles;
- a second control unit, which is connected to the first control unit, for performing, in parallel with the first portion of the large-scale calculations of the first control unit, a second portion of the large-scale calculations of the large-scale sensor data, by using the same clock as the first control unit, wherein the second control unit performs calculations regarding environment recognition among the large-scale calculations, and the calculations regarding environment recognition comprise calculations of data acquired by sensors comprising a camera and a laser scanner;
- a micro control unit for monitoring a state of power of the autonomous driving robot, monitoring obstacles located near the autonomous driving robot, controlling a motor of the autonomous driving robot, controlling a relay module of the autonomous driving robot, and communicating with the first control unit; and
- wherein the mini integrated control device further comprises a power supply configured to supply power to sensors used by the autonomous driving robot, the first control unit, and the micro control unit.

9. The mini integrated control device of claim 8, wherein the first control unit receives the large-scale sensor data via a gigabit Ethernet (GbE) switch.

10. The mini integrated control device of claim 9, wherein the autonomous driving robot selects the travel path and travels to the destination while avoiding obstacles while having a low velocity.

* * * * *